United States Patent
Olofsson et al.

(10) Patent No.: US 8,520,528 B2
(45) Date of Patent: Aug. 27, 2013

(54) WIRELESS SERVICE PROVISION

(75) Inventors: Henrik Olofsson, Bureå (SE); Johan Johansson, Stockholm (SE); Tauno Ruuska, Stockholm (SE); Per Tengqvist, Åkersberga (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 171 days.

(21) Appl. No.: 13/073,511

(22) Filed: Mar. 28, 2011

(65) Prior Publication Data

US 2011/0182202 A1 Jul. 28, 2011

Related U.S. Application Data

(63) Continuation of application No. PCT/CN2008/072543, filed on Sep. 26, 2008.

(51) Int. Cl.
*H04W 16/00* (2009.01)
*H04W 24/00* (2009.01)

(52) U.S. Cl.
USPC .......................................... 370/241; 370/328

(58) Field of Classification Search
None
See application file for complete search history.

(56) References Cited

U.S. PATENT DOCUMENTS

| | | | |
|---|---|---|---|
| 6,294,961 B1 | 9/2001 | Baba | |
| 6,970,702 B1 | 11/2005 | Martin | |
| 2002/0142796 A1* | 10/2002 | Sutton et al. | 455/553 |
| 2002/0155831 A1* | 10/2002 | Fodor et al. | 455/426 |
| 2003/0227941 A1 | 12/2003 | Lee | |
| 2005/0048953 A1* | 3/2005 | Ohara | 455/412.1 |
| 2005/0266845 A1* | 12/2005 | Aerrabotu et al. | 455/436 |
| 2006/0040700 A1 | 2/2006 | Roberts et al. | |
| 2006/0072481 A1* | 4/2006 | Hirsbrunner et al. | 370/254 |
| 2007/0165825 A1* | 7/2007 | Ko et al. | 379/219 |
| 2007/0201414 A1 | 8/2007 | Desai et al. | |
| 2009/0061860 A1* | 3/2009 | Jiang | 455/433 |

FOREIGN PATENT DOCUMENTS

| | | |
|---|---|---|
| CN | 1469659 A | 1/2004 |
| WO | WO 03032579 A2 | 4/2003 |
| WO | WO 03047280 A2 | 6/2003 |

OTHER PUBLICATIONS

Extended European Search Report issued in corresponding European Patent Application No. 08877029.2, mailed May 21, 2012.
Written Opinion of the International Searching Authority issued in corresponding PCT Patent Application No. PCT/CN2008/072543, mailed Jul. 2, 2009.
International Search Report issued in corresponding PCT Patent Application No. PCT/CN2008/072543, mailed Jul. 2, 2009.

* cited by examiner

*Primary Examiner* — Min Jung
(74) *Attorney, Agent, or Firm* — Brinks Hofer Gilson & Lione

(57) ABSTRACT

The invention pertains to wireless service provision comprising reception or transmission of wireless signals from/to a communications system not (yet) available for public communications in an environment providing telecommunications services of another communications system. An example embodiment of the invention explores and implements triggering of a user equipment to perform test or measurement of a target network from an originating network, whereas the user equipment triggers establishment of a communications channel in the target network, the target network providing test signals to the user equipment.

15 Claims, 4 Drawing Sheets

WIRELESS SERVICE PROVISION

CROSS-REFERENCE TO RELATED APPLICATION

This application is a continuation of International Application No. PCT/CN2008/072543, filed on Sep. 26, 2008, which is hereby incorporated by reference in its entirety.

TECHNICAL FIELD

The technical field includes system interactions of communications systems. More particularly, it includes wireless service provision comprising reception or transmission of wireless signals from/to a communications system not (yet) available for public communications in an environment comprising a communications system available for public communications.

BACKGROUND

Wireless communications develop continuously. New communications systems entail and other may disappear. When establishing new communications systems, an operator providing commercial services normally wants to know whether the system as established provides expected or designed performance. Example wireless communications systems include radio communications systems and optical communications systems.

Cellular wireless communications systems provide a means of covering a surface with wireless communications resources. A surface to be covered by wireless services is divided into a number of smaller areas, cells, each cell being served by one or more base stations. With a great number of base stations, each base station providing services for a corresponding cell of service coverage, a great surface is covered. In case a wireless resource such as radio frequency spectrum is used repeatedly in more than one cell, a great service area can be covered also with a limited amount of the wireless resource. Today, there is a plurality of well known cellular radio communications system made available to the market, such as GSM (Global System for Mobile communications, CDMA 2000 (Code Division Multiple Access 2000), UMTS (Universal Mobile Telecommunications system), WiMax (Worldwide Interoperability for Microwave Access) and LTE (Long Term Evolution).

International Patent Application No. WO03047280 discloses a method of testing a digital mobile phone network comprising measurements on real traffic or created test traffic using a test mobile phone coupled to a computer. Measurements made by the computer are sent as traffic to create one or more data streams within the mobile phone network. Time data, for example derived from the network itself or from a GPS receiver may be included with the measurement data. In one embodiment, the test mobile communications device comprises an unmodified consumer mobile communications device. The method also comprises reading of signaling data and measurement data from different interfaces of a communications network infrastructure.

U.S. Pat. No. 6,294,961 provides selectable oscillation circuitry for switching between two communicating modes. Digital Cellular System, DCS, and Global System for Mobile Communications, GSM, both employ GMSK for modulating digital signals. A cellular phone is controlled so as to select and properly use one of two voltage-controlled oscillators in a cellular phone that can be used for both DCS and GSM.

US Patent Application No. US20060040700, A1 describes a method and apparatus for selecting cells in a mobile telecommunications system, the system comprising a network of a plurality of cells of a Universal Mobile Telecommunications System, UMTS, and a network of a plurality of cells of a second Radio Access Technology, RAT, the method comprising, at a user equipment device when in UMTS mode, flagging in a neighboring cell list stored on the user equipment device information for a cell of a second RAT which is known to be unsuitable for selection. The patent application provides strategies for User Equipment measurement procedures, available in UMTS idle mode and during cell reselection to a GSM cell. The GSM neighboring cell lists may contain GSM cells that are barred and which are to be removed from the lists until expiry of a time interval, $T_{barred}$, or there may be a list for containing details of cells which are barred and details of the barred/unsuitable cell is added to this list. The barred cells may keep their indices in the list but no measurement is performed; i.e. no scan at the frequency of that cell is made.

U.S. Pat. No. 6,970,702 describes a system for and method of cellular telephone system monitoring. It includes a cellular switch which is remotely accessed and placed in a call monitor mode. A GPS receiver is connected to a mobile telephone via an interface unit. Call performance information, e.g. signal strength, BER and call events, are recorded at the switch and downloaded to a remote computer. GPS location information is transmitted by the mobile telephone and received by the remote computer via the switch. The computer receives and stores the recorded call and GPS information and graphically displays this information, along with a map indicating the location of the mobile telephone.

To achieve improved performance levels, cellular telephone service providers position antennas in geographically desirable locations and tune and/or direct antennas in optimal ways. While radio frequency, RF, engineering tools exist to help properly position individual cellular telephone cell site antennas and configure overall cellular systems, the only effective way of actually determining whether the cellular antennas and their tuning/positioning have been properly accomplished is to perform field tests with a cellular telephone. Typically, such field tests are accomplished with drive tests wherein an RF or cellular engineer drives a vehicle around in a designated area while making one or more telephone calls using his mobile cellular telephone. During the drive test, the RF engineer monitors call performance by noting call drops, for example, and/or collecting actual downlink data such as signal strength directly from the mobile telephone.

The RF engineer then returns to his office where he uploads the collected data to, e.g., a computer spreadsheet program, and attempts to combine or correlate this data with data from the same time period as the drive test, obtained from the cellular system's controller or switch such as a Mobile Telephone Switching Office, MTSO, or Mobile Switching Center, MSC. The data from the switch might include signal strength, bit error rate, BER, and other call events, such as call handoffs, during the time that the RF engineer was performing the drive test. Once an analysis of the combined data is complete and changes to the cellular system are made, if necessary, the RF engineer will typically return to the drive-test area to confirm that the changes made have improved overall system performance. The iterative procedure of drive testing, system changing, and subsequent drive-test confirmation continues as long as believed that improved service, e.g. coverage and continuity, can be achieved.

While drive-tests might provide an effective method for confirming and testing system performance, it is also an extremely inefficient exercise, in terms of time, for an RF engineer. Instead of spending valuable time making calculations and studying data to optimize a cellular system in an office setting, the RF engineer might spend a great deal of his working time on driving to, around and from an area under investigation.

In U.S. Pat. No. 6,970,702 persons other than RF engineers perform cellular system drive-tests.

SUMMARY

Cited prior art technology for estimating radio coverage focuses on a single system for communications and measurements and also requires that this system is made available for communications.

None of the cited documents reveal a method or apparatus providing interactions of different communications system such that signaling or measurement triggering is provided over one communications system while measurements are performed on another.

In evolving communications systems, new technology systems entail and others are obsolete and disappear. Prior to open a communications system for public use and commercial services, most providers or operators would like to estimate their service quality and radio coverage provided in order not to receive a great number of complaints and for being capable of putting a price on their offered service in relation to perceived value of a customer and expected demand for offered services.

Prior art technology as cited does not render this possible, even though a network could be opened for traffic while no subscriptions are made available on the consumer market. For the case that the system is not made available to public users, the provider has to rely solely on his own measurements, similar to drive-test measurements as described above. This incurs both high costs and limited reliability due to amount of required measurements to ensure high reliability.

Hence, it would be of a great value to a wireless services provider, and in the end also to users of the services, if user equipment in public use could provide measurement data also for developing technologies while these have not yet been made publicly available. Thereby, e.g., coverage and service quality can be ensured prior to the new technology is made available for public services.

Consequently, it is an object of preferred embodiments of the invention to provide communications interaction between, e.g., legacy systems open for public services and established emerging technology networks.

It is also an object of example embodiments of the invention to perform radio coverage or service quality measurements of a system not yet open for public use while providing services of another system, such as a legacy system.

A further object of an example embodiment is to provide radio coverage or service quality measurements of systems of established interworking or interoperability.

Also, it is an object of a preferred example embodiment to provide measurement reports over the emerging technology network while not yet opened for public use.

Another object of example embodiments of the invention is to provide network measurement control such that desired measurement data can be collected while not collecting more than necessary data.

A further object of an example embodiment of the invention is to provide measurement data for a performance comparison or validation of a legacy system and an established system of an emerging technology.

Additionally, it is an object of an example embodiment of the invention to provide measurements from user equipment operating in different modes, such as idle mode and connected mode.

The invention provides a method and system of wireless service provision by communications involving a system open for public use for service provision in a system not available for public use as described in detail below.

DETAILED DESCRIPTION

Figure 1:
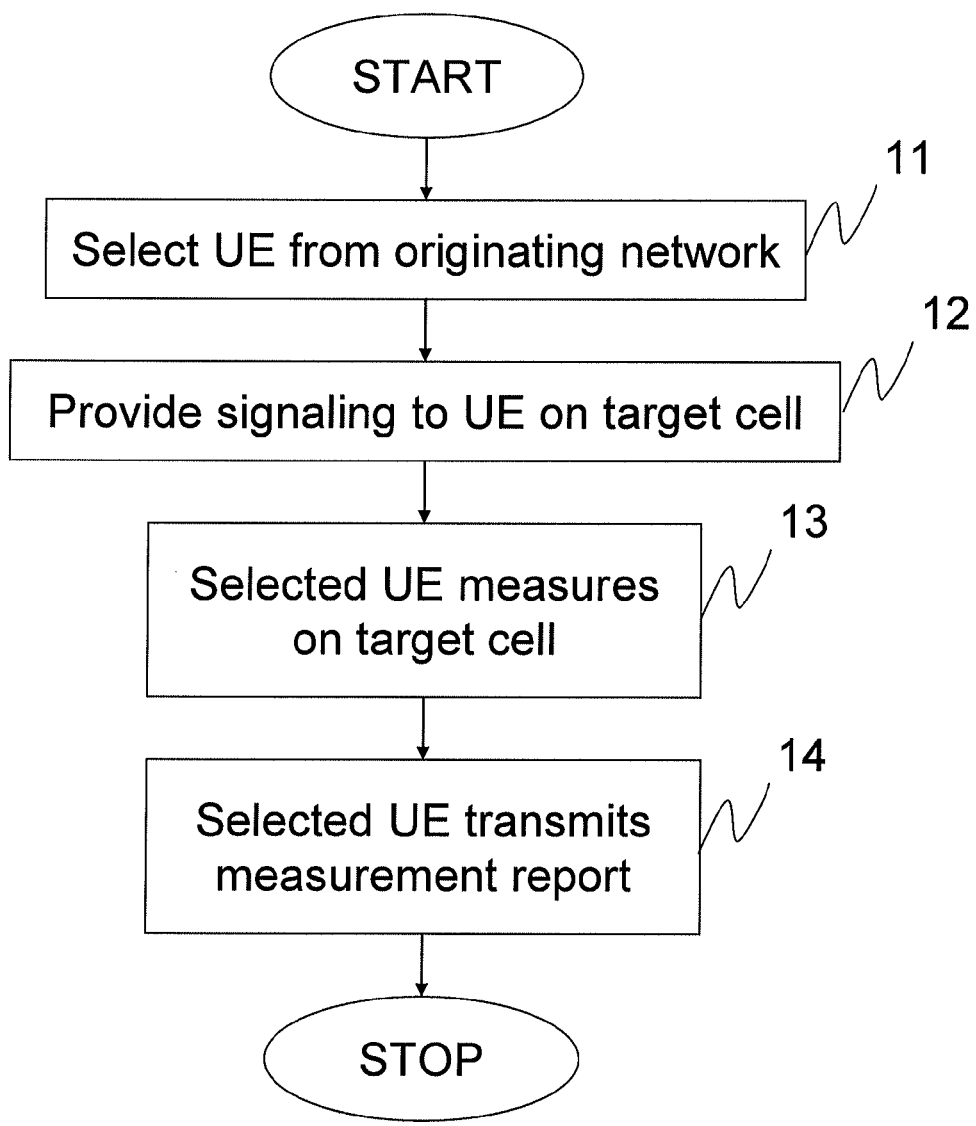
FIG. 1 illustrates schematically preferred processing according to an embodiment of the invention.

For emerging technology systems, it is greatly desirable to reduce the need of drive tests for planning or estimating, e.g., radio coverage or service quality of a wireless communications system or subsystem while still providing data necessary for establishing reliable operations and a reliable service quality level when the communications system is made available for public use.

The invention identifies that to a great extent user equipment of tomorrow, and even of today, is dual-mode equipment or multi-mode equipment. In case one mode includes a mode of an emerging technology or of a system technology not (yet) available for public use, dual-mode or multi-mode equipment potentially can contribute to improve communications quality of both a legacy system and a system not (yet) made available for public use. Non-exclusive examples of such systems not available for public usage are newly deployed systems using a new radio access technology, systems, possibly of a same radio technology, providing new frequency bands or adding radio carriers not earlier supported to an existing network, and systems where part of the network previously available for public usage is (temporarily) brought into a state of operation preventing public usage, e.g. for the purpose of tuning or reconfiguration.

According to a preferred embodiment of the invention, a network available for public communications or commercial services provides control signaling to user equipment for participating in recording of measurement data of a system not (yet) open for public use. As non-exclusive examples, participating user equipment comprises dual-mode or multi-mode handsets and dual-band or multi-band terminals, where dual-mode and multi-mode handsets are capable of operating on more than one radio access technology, such as GSM and WCDMA (Wideband Code Division Multiple Access) handsets and multi-band terminals are capable of operating in more than one frequency band, such as GSM/DCS mobile stations.

When a participating UE is switched on, it attempts to make contact with a public land mobile network, PLMN, using a particular radio access system mode, the choosing of radio access mode, for instance UTRA, GSM or GPRS may be automatic or manual.

The UE looks for a suitable cell of the chosen PLMN and chooses that cell to provide available services, and tunes to its control channel. This choosing is known as camping on the cell. The UE will then register its presence in a registration area of the chosen cell if necessary, by means of a location registration procedure.

The cell of an originating network on which a UE is camping is denoted originating cell. The cell of the target network for which measurements are performed is denoted target cell.

For a typical situation when the invention is applied, a network open for public use or in commercial operation forms the originating network; a network, or sub-network, not (yet) enabled for providing commercial services or public use forms the target network.

Preferably, user equipment devices, UEs, connected to an originating network may be controlled to assist in testing of neighboring cells of a target network to complement or replace drive-testing measurements of the cells. Of course, the UEs controlled to assist in the testing must support the one or more radio access technologies required for performing the measurements of the cells of the target network.

UEs connected to the originating network preferably perform measurements of and determine data such as CQI (Channel Quality Indicator) or RSSI (Received Signal Strength Indicator).

FIG. 1 illustrates schematically preferred processing according to an embodiment of the invention. Originating network informs (12), from an originating cell of the originating network, selected (11) UEs in the originating cell and also being within radio coverage of one or more neighboring cells of the target network, to measure on a target cell. One required selection criterion is UEs to support the radio access technology or mode of operation for measurements of the target network/target cell.

A UE comprises transmitter and receiver for receiving and sending radio frequency signals. It also comprises processing means for processing received data and performing measurements including received signals or data and at least some operational memory and some storage capacity, which is realized e.g. in the form of read only memory, ROM, or flash memory. The operational memory preferably is shared flash memory but could also be random access memory.

UEs participating in the test/measurement measure (13) on signals of the new cell and sends a report (14), preferably over the radio interface of the target cell, on the outcome of the measurement(s).

Preferably, UEs measure on the new cell, perform random access and report measurement data through a channel without restrictions or limitations of predefined states, in practice imperative during commercial operations. Thereby more information can be provided timely with a minimum of signaling and energy consumption of the participating UE.

The selection process (11) preferably includes,
UE capabilities for performing and reporting measurements
UE location, i.e. the geographical position for which measurement data is desired.
The signaling (12) to UE preferably includes
Signals or parameters to measure on or to determine from measured data.
Reporting format comprising e.g. what to report and preferably also when and in what format to report.

According to a first embodiment of the invention, a UE performs measurements of the one or more target cells and the related reporting while in idle mode in the originating cell.

According to a second embodiment, a UE e.g. in active mode performs measurements of the neighboring one or more target cells when a predefined DRX scheme so allows and the inactivity is not utilized for, e.g., mobility measurements. DRX is an acronym for Discontinuous Reception.

In this specification, a UE's DRX gaps refer to time intervals when a UE is not required to be capable of receiving signals and could turn off radio frequency parts.

In the selection process (11), in densely populated areas a subset of available UEs is preferably selected to participate in the measuring to limit the amount of data to communicate and to process. An excessive amount of selected UEs would risk causing unnecessary load of the target cell without providing a corresponding improvement as regards measurement certainty.

Idle mode UEs do not have a dedicated channel established, but are listening on common channels. Preferably, a network originated parameter is transmitted (12) on a common channel. As an alternative, a dedicated channel is setup particularly for transferring of the parameter and other information as need be. Active mode UEs can be ordered in a dedicated signaling channel set-up. A UE receiving one or more such parameters and being enabled for participating in the (test) measurements comprises circuitry arranged for determining from inclusion of the one or more parameters whether the UE should participate and perform the test/measurement from a selection criterion.

There are three preferred modes of operations for the circuitry arranged to determine whether or not to participate in the test/measurements from the parameter information received in a participating UE.

The UE generates a random number which is combined with network originated information in order to distinguish whether the UE shall assist or not in the testing.
The UE performs a selection or hash function based on received one or more parameters and e.g. IMSI information to distinguish if it shall assist or not in the testing. As a simple example, a predefined (relative) number of digits of IMSI could be required to match communicated one or more parameters for participation. More generally, a hash function is a transformation that takes a variable-size input and returns a fixed-size string, which is called the hash value.
The UE compares a UE class value assigned to it by core network, CN, and a UE class value received from the originating cell on the common or dedicated channel. In a simple example the UE class comprises two values, represented by one bit indicating whether UE is available for measurements or not. Though for such a simple example no transmission of class information is required if the UE preferably is arranged not to participate unless the class value so indicates.

Non-limiting examples of UE class values are subscription group or UE capabilities. According to an example embodiment of the invention, CN assigns each UE a class value when the UE performs tracking area update, TAU.

The signaling to UE on target cell (12) is preferably transmitted from the originating network. The UE is e.g. supposed to already be tuned to a cell of that network. As an alternative, the signaling is transmitted from the target network. The UE then need be tuned to a cell of the target network. Target cells are preferably specified in terms of radio access technology or carrier frequency. Such information is, also preferably, transmitted to the UE from an originating cell in order to reduce time for UE to lock its tuner circuitry and synchronize to the target frequency and data transmissions on that frequency, respectively.

Example signaling provided to UE also comprises information on the target cell from which to measure on received signals (12), either explicitly by providing a particular cell-identity, or implicitly by providing a cell group-identity, tracking area or cell class that the target cell should belong to. In an example realization, included for the purpose of clarity, the target cell transmits such example signaling by transmitting a single bit indicating that test measurements should be performed for that cell.

In this specification, a tracking area and its identity is a generic concept, comprising e.g. UTRAN registration areas, URAs, location areas, LAs, and registration areas RAs and corresponding identities, not being limited to a particular system or acronyms applied for that system. In this context, UTRAN refers to Universal Terrestrial Radio Access Network of e.g. a WCDMA network.

The network signaling (12) to UE preferably also includes information on what signals or parameters to measure or determine. At best, the predefined measurements according to the system specification are satisfactory for determining service quality and radio coverage and no additional tests/measurements need be defined for full compatibility with commercially available user equipment. In particular realizations, cell ID, a received signal strength indicator, RSSI, reference signal received power, RSRP, or reference signal received quality, RSRQ, is included in the tests/measurements; test/measurement data to be conveyed to a base station in a test or measurement report or a measurement record thereof as further described below. Such measurements preferably include e.g. received power of Common Pilot Channel, CPICH, Received Signal Code Power, RSCP, and CPICH energy to interference ratio $E_c/I_0$ and Channel Quality Indicator, CQI, in e.g. UMTS and some other CDMA systems and corresponding parameters of other systems.

In a cellular communication system, a cell could be locally identified by a local identity, LI, also known as physical layer cell identity, PCI. This local cell identity is not necessarily unique within a system of interest, i.e., the identity may be reused for more than one cell. In a cellular communication system, a cell could also be identified with a global cell identity, GCI, which is unique in the system. The cell identity, cell ID, preferably included with the measurements may be a global cell ID, such as GCI, or a local cell ID, such as LI/PCI, or a combination thereof. Use of both kinds of identities for a cell has the advantage that the LI can be made shorter, and thereby requires a smaller number of bits in a transmission than a global identity, for example when a UE device is signaling identity of a cell that has been detected by the UE. The GCI requires more bits in a transmission. Combining GCI with the LI/PCI for cell identification provides an advantage that transmission time intervals for broadcasting of the GCI can be made greater than otherwise, and the GCI need not be frequently included in reports from the UE, while information on identity of the cell may still be provided accurately.

According to one example embodiment of the invention, signaling (12) to UE includes instructions for UE to perform one or more access attempts to the target cell to verify operations.

According to this example embodiment, UE should measure (13) signals and parameters of the target cell according to signaled instructions from originating network. It is also preferred that UE measures signals or parameters of the originating cell. Measurement data is compared and measurement biases can be corrected for, thereby increasing test/measurement reliability.

According to a preferred mode of the invention, particular predefined test patterns are applied providing information that participating user equipment should perform test measurements comprising a certain periodicity. The very UE is still responsible for selecting when to measure depending on its DRX gaps in the originating cell or its idle mode periods. If the UE is capable of receiving GPS (Global Positioning System) information, positioning information from a GPS receiver is preferably included with test results in a measurement report. In case the UE is not capable of receiving GPS information or as a complement, e.g. for fast startup, a coarse position information is preferably derived from the cell ID of the source cell or the target cell on which the UE is camping, the measurement report including position information or cell ID of source or target cell, not excluding a combination thereof.

Measurement reports are preferably transmitted (14), (22) to the base station of the target cell. The UE should report the result of the measurements to a network entity being responsible for evaluating the measurements. This network entity is referred to as a test evaluation server, TES. When measurement reports are transmitted (14) to a base station of the target network, there is no need for the originating network to connect to the test evaluation server of the target cell. Of course, transmission (14) of measurement reports is possible also in the originating cell but at the expense of additional network signaling and communications relations, among other things draining batteries of battery powered UEs. When measurement reports are transmitted to the target network, the receiving base station or base station controller will forward received information to the relevant TES. Sending of measurement reports to the base station of the target cell reduces the amount of data needed to be sent from UE and minimizes adaptations of a participating legacy system for implementing the invention.

Figure 2:
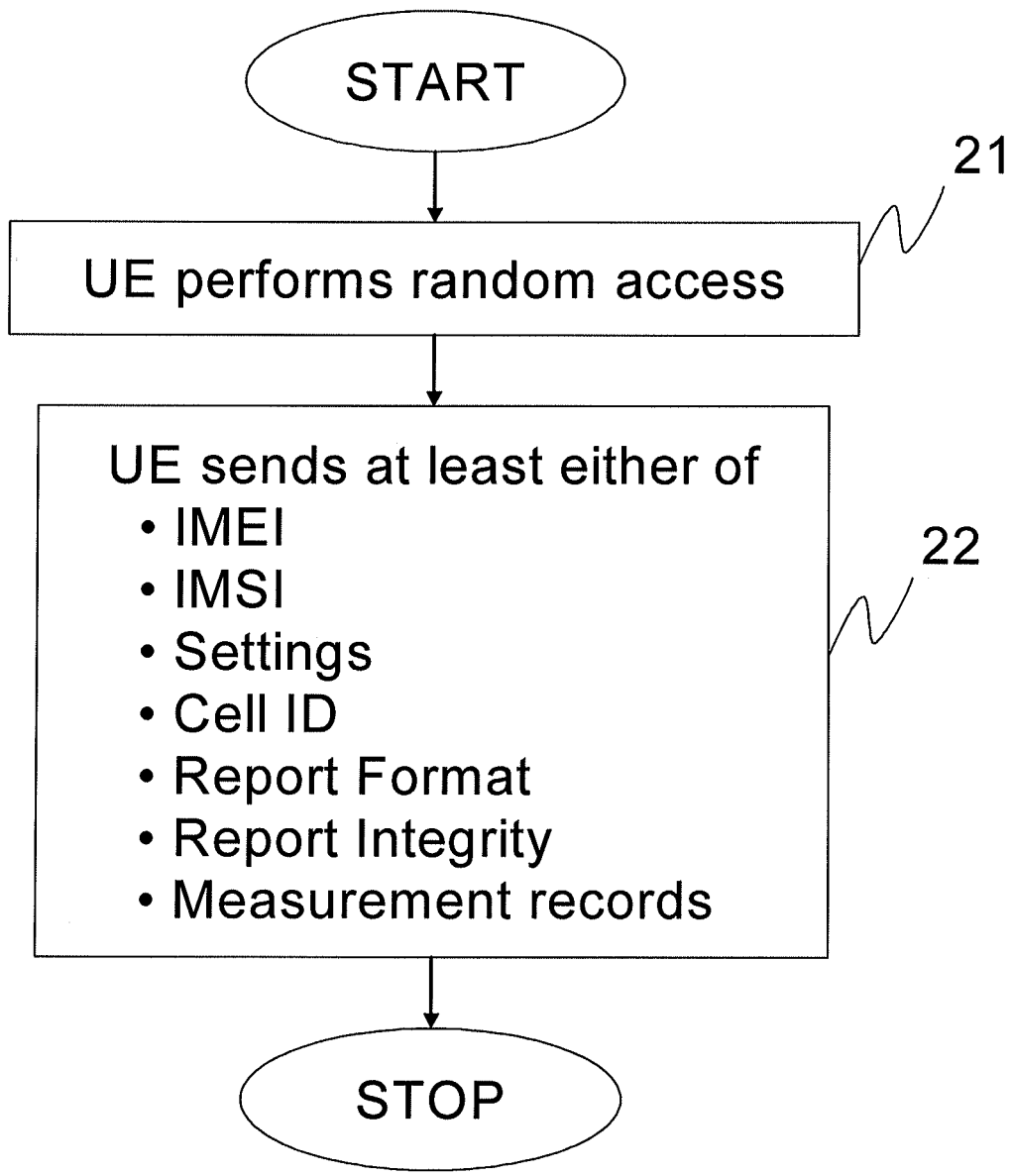
FIG. 2 shows a simplified flow chart for measurement report transmission to a target base station according to an embodiment of the invention.

FIG. 2 shows a simplified flow chart for measurement report transmission to a target base station according to an embodiment of the invention. When accessing the target cell for measurement report transmission, a random access message is preferably transmitted (21) comprising a particular test code informing the target cell to set up a test report communication channel. In a non-exclusive example, the user equipment device receives the test code in a transmission from the originating network preferably also sending the test code to the target network. Upon network acknowledgement, the communications channel is set-up and measurement data is sent. As already intimated above, the communication channel is typically not required to provide services in connected mode. In case the required transmission time is greater than one DRX gap, the UE shall provide the measurement data in consecutive DRX gaps according to a preferred mode of the invention. The measurement then does not need to affect the connection of the originating network. When the transmission of a measurement report is completed, the test report communication channel is closed.

The transmitted (22) measurement report preferably comprises at least one of
   International Mobile Equipment Identity, IMEI,
   International Mobile Subscriber Identity, IMSI,
   Settings comprising measurement and equipment data, such as test conditions and UE capabilities,
   Measurement record,
   Report Type including information on various one or more measurement records, and Report Integrity, such as cyclic redundancy checking for error detection.

When the participating UE is not camping on the target cell, it is not possible to provide a temporary identity, such as RNTI (Radio Network Temporary Identity) and a UE identity of the originating network, such as IMSI, should be reported to the target network for identification.

Measurement and equipment data is preferably provided in order to determine reliability and accuracy of the test measurement data.

Figure 3:
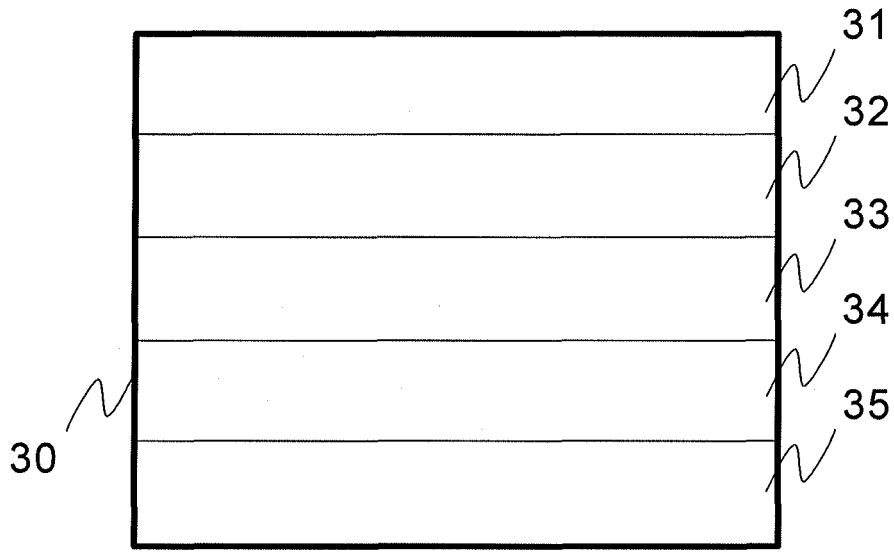
FIG. 3 displays schematically an example measurement record (31) included in the signal format for measurement report transmission from a participating UE and the target cell.

FIG. 3 displays schematically an example measurement record (31) included in the signal format for measurement report transmission from a participating UE and the target cell. The example measurement record (30) comprises two types of report fields, measurement type (31) and measurement data (32-35).

Figure 4:
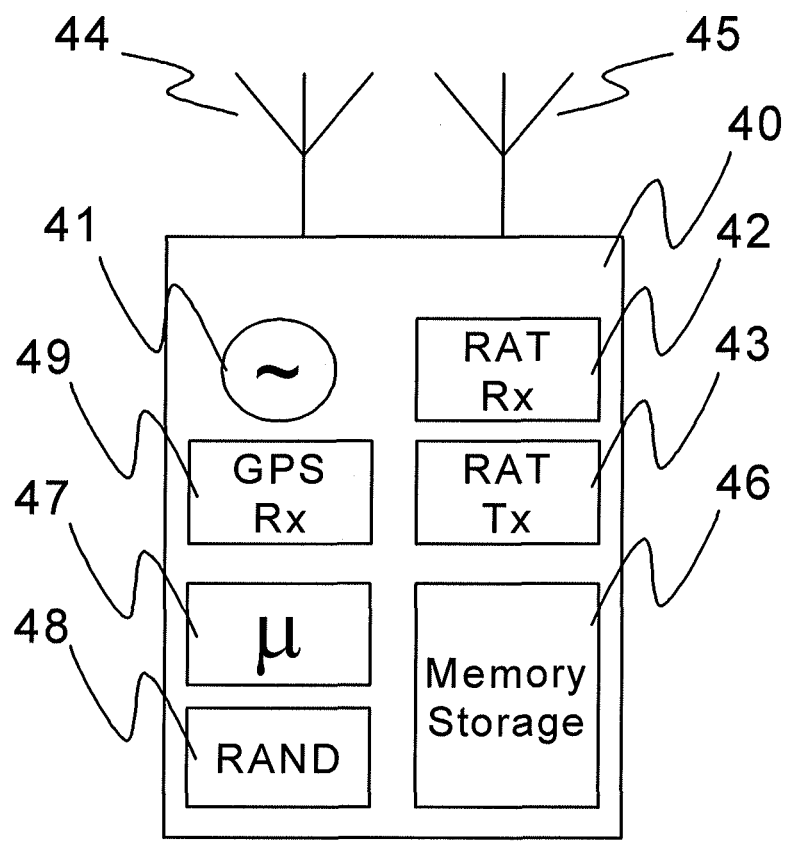
FIG. 4 depicts a principal block diagram of a user-equipment device according to an embodiment of the invention.

FIG. 4 depicts a principal block diagram of a user-equipment device (40), UE, according to an embodiment of the invention. Oscillator circuitry (41) tunes operating frequency of the UE to a frequency of an originating-cell base-station or a target-cell base-station as need be. Depending upon radio access technology, RAT, and available time for adjusting a tuner, the UE includes more than one tuner for some RATs. UE receiver means (42) receives signaling comprising information as needed for initiating measurements on a target cell from a network that not necessarily uses the same radio access technology or frequency range as the base station of the target cell. UE transmitter means (43) transmits one or more access requests to the target cell base station and receiver means (42) receives signals transmitted from the target cell base station. Transmitter and receiver means (42), (43) are adapted as need be to the particular one or more radio access technologies of the originating-cell base-station and target-cell base-station. This adaptation includes adaptation to the particular one or more modulation schemes applied in the originating network and target network. Non-excluding examples of such modulation schemes include Gaussian minimum shift keying, GMSK, frequency shift keying, FSK, phase shift keying, PSK, thereby also referring to their correspondences for differential detection, or application in code division multiple access, CDMA, time division multiple access, TDMA, frequency division multiple access and orthogonal frequency division multiple access, OFDMA. Depending on radio access technology, the UE not necessarily uses identically the same receiver or transmitter for the originating network and target network. UE receives and transmits radio frequency signals via one or more antenna elements (44), (45). Data received, or stored to be transmitted or processed, is stored in memory or storage means (46). Establishment of measurement reports also allocates the memory and storage means (46). Non exclusive examples of memory and storage means (46) are RAM and flash memory circuitry. Processing circuitry (47) operates on received data and measured quantities of received signals stored in memory or storage means (46) for establishment of measurement reports. Further, processing circuitry (47) is preferably arranged to determine whether the particular UE should participate in a particular test measurement. As described above for one preferred mode of the invention, this is determined from random number generation. A pseudo-random number generator (48) is included in UE. Both hardware pseudo-random number generators (48) and software implemented pseudo-random number generators (48) are applicable. Particularly for the latter case, the pseudo-random number-generator is preferably integrated with the processing circuitry (48) implementing the pseudo-random number generator (48) in software stored in memory or storage means (46). Preferably, the storage means also stores a computer program product. The computer program product could be installed at manufacturing, or installed from a wired or wireless interface for loading the computer program product into the storage means. Until loaded into the user equipment, the computer program product could be stored on virtually any available storage medium for computer programs such as hard-disk drives, CDs, DVDs or flash memories. As explained in detail above, measurement data is preferably combined with a geographical position of the measurement. A UE preferably then comprises a receiver (49) for receiving GPS (global positioning system) signals. Of course, other similar positioning systems, such as GLONASS (Global Navigation Satellite System), are of interest as is positioning from using triangulation or other terrestrial positioning methods, e.g. based upon timing advance or time of arrival. The smaller the system cell size, the less is the need of a GPS receiver (49).

Figure 5:
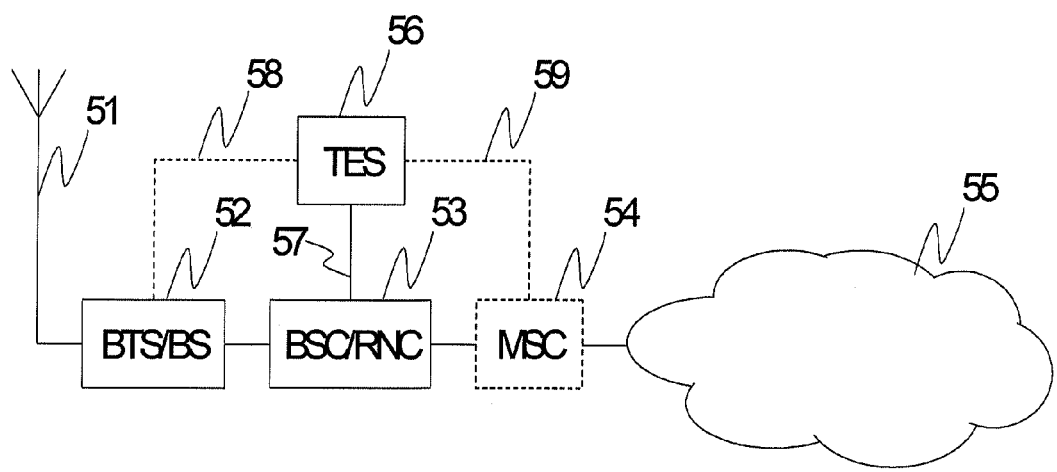
FIG. 5 monitors a simplified block diagram of a sub-network of an example target network according to the invention.

FIG. 5 monitors a simplified block diagram of a sub-network of an example target network according to the invention. The sub-network comprises one or more antennas (51) for transmitting or receiving signals to or from a UE (40). The signals are modulated or detected in a base station (51). Whether the base station unit is a GSM base transceiver station, BTS, a UTRAN base station, BS, or a base station of some other emerging system is not of primary importance. Measurement reports received are processed in a test evaluation server, TES, (56) comprising storage elements and processing circuitry. Preferably, the TES is connected (57) to a control unit (53) of the target radio communications system, such as a base station controller, BSC, of a GSM system or a radio network controller, RNC, of a WCDMA system, for access and data retrieval. Of course, the particular acronym is of less importance for the invention. A preferred alternative is to connect the TES (56) to a unit (54) connected (59) to a core network or public switched telephone network, PSTN, (55). In e.g. GSM systems such a unit is referred to as a Mobile Switching Centre, MSC, whereas in WCDMA systems it is referred to as an RNC. In an alternative realization, of particular interest for systems with control functionality included in base station units, TES (56) is connected (58) directly to the base station unit (52). Various units (52-54), (56) represented by active communication blocks comprise processing equipment. The respective processing equipment of the units operates according to one or more computer program products stored in storage means of the various units or of one or more connected units for storage.

In this description certain acronyms and concepts widely adopted within the technical field have been applied in order to facilitate understanding. The invention is not limited to units or devices due to being provided particular names or labels. It applies to all methods and devices operating correspondingly. This also holds in relation to the various systems that the acronyms might be associated with. While the invention has been described in connection with specific embodiments thereof, it will be understood that it is capable of further modifications. This application is intended to cover any variations, uses, adaptations or implementations of the invention, not excluding software enabled units and devices, within the scope of subsequent claims following, in general, the principles of the invention as would be obvious to a person skilled in the art to which the invention pertains.

The invention claimed is:

1. A method of wireless service provision in a wireless cellular communications system comprising a first and a second communications network and user equipment equipped for communications in both networks and in public use of the first communications network, the method comprising providing:
> signaling from the first communications network for triggering the user equipment to perform test or measurement of the second communications network;
> establishing of a communications channel in the second communications network as triggered from the user equipment;
> providing test signals to the user equipment while the second communications network is barred from public communications;

wherein the method further comprising
including in a measurement report at least one of international mobile equipment identity, international mobile subscriber identity, settings, cell identity, report format, report integrity, and measurement parameter record.

2. The method according to claim 1, comprising
in a user equipment
> receiving test signals;
> > recording parameters related to the received test signals; and
> > providing one or more measurement reports comprising the recorded parameters.

3. The method according to claim 1, comprising
establishing of a communications channel as triggered by the user equipment by transmission of a random access message.

4. The method according to claim 1, comprising
establishing a communications channel as triggered by the user equipment by means of test code informing the target cell to set up a test report communication channel.

5. The method according to claim 4, comprising the first communications network sending the test code to the user equipment device.

6. The method according to claim 5, comprising the first communications network sending the test code to the second communications network.

7. The method according to claim 1, comprising
receiving, in the second communications network, measurement parameters and data related to geographical position of measurement data.

8. The method according to claim 1, comprising
recording parameters related to received signals from both the first and the second communications networks.

9. The method according to claim 1, comprising
including parameters related to signals received in the user equipment from both the first and the second communications networks in a measurement report and
transferring of the measurement report to the second communications network.

10. The method according to claim 1, comprising
recording parameters of the second communications network while the user equipment is in idle mode in the first communications network, or
recording parameters of the second communications network during a user equipment DRX gap of the first communications network.

11. The method according to claim 1, comprising selection of one or more user equipment devices for test or measurement purposes wherein the selection is based upon at least one of
comparison of a pseudo-random number,
an identity or a hash function, and
a user equipment class value.

12. The method according to claim 1, comprising
assigning a user-equipment device a class value at tracking-area update; and
determining whether the user equipment shall participate in test measurement based upon the assigned class value.

13. An apparatus of wireless service provision in a wireless cellular communications system comprising a first and a second communications network, wherein the apparatus is equipped for communications in both networks, the apparatus comprising
receiving means arranged for receiving signals of the first communications network;
processing means configured to trigger establishment of a communications channel in the second communications network upon reception of a triggering signaling from the first communications network irrespective of whether the second communications network is barred or otherwise unavailable for regular operations; and
receiving means arranged for receiving signals of the second communications network;
wherein the apparatus further comprising
processing mean arranged for determining one or more parameters from signals of the second communications network as received by the receiving means;
memory means arranged for storing of the one or more determined parameters;
oscillating circuitry enabled for tuning of apparatus operating carrier frequency for transmission or reception of the first communications network and second communications network; and
the processing means being arranged for tuning the oscillating circuitry to an operating frequency of the target communications network upon receiving triggering signaling on a frequency of a first communications network to perform measurements on a frequency of the second communications network not available for public use.

14. The apparatus according to claim 13, comprising
position receiving means for providing a location of the apparatus;
processing means for establishing a measurement report; and
transmitting means for transferring the measurement report data.

15. A system of wireless service provision in a wireless cellular communications system comprising a first and a second communications network and an apparatus equipped for communications in both networks wherein the first communications network is arranged for providing signaling for triggering the user equipment to perform test or measurement of the second communications network; and
the second communications network is arranged for providing test signals to the user equipment while the second communications network is barred from public communications upon receiving triggering of establishment of a communications channel in the second communications network,
wherein
the second communications network comprises receiving means arranged for receiving measurement reports on the test signals; and
the second communications network comprises a test evaluation server for storing and evaluating measurement reports.

* * * * *